United States Patent [19]

Esposito

[11] Patent Number: 4,998,697

[45] Date of Patent: Mar. 12, 1991

[54] THREE LEGGED WORKBENCH FRAME

[76] Inventor: Joseph R. Esposito, 329 Hickok Ave., Syracuse, N.Y. 13206

[21] Appl. No.: 387,337

[22] Filed: Jul. 31, 1989

Related U.S. Application Data

[63] Continuation-in-part of Ser. No. 231,829, Aug. 12, 1988, Pat. No. 4,854,531.

[51] Int. Cl.$^5$ .............................................. F16M 11/00
[52] U.S. Cl. ..................................... 248/165; 248/188; 248/188.1; 182/151; 182/181; 403/403; 108/157
[58] Field of Search .................. 248/165, 188.1, 188.8, 248/188, 220.4; 108/157; 403/403, 205, 382, 231, 217; 182/181, 185, 224, 151, 179

[56] References Cited

U.S. PATENT DOCUMENTS

| 248,188 | 12/1870 | Congle . | |
|---|---|---|---|
| 323,705 | 8/1985 | Maunder . | |
| 1,195,488 | 8/1916 | Marshall | 182/179 |
| 1,577,724 | 3/1926 | Jenkins . | |
| 1,774,548 | 9/1930 | Feeny . | |
| 2,022,291 | 11/1935 | Lehman . | |
| 2,039,125 | 4/1936 | Stuart . | |
| 2,084,758 | 6/1937 | Anderson . | |
| 2,931,129 | 4/1960 | Boniface . | |
| 3,103,374 | 10/1963 | Portnoy . | |
| 3,836,270 | 10/1974 | Chambers . | |
| 3,925,954 | 12/1975 | Snow et al. . | |
| 3,988,872 | 11/1976 | Adamson et al. | 403/217 |
| 4,011,726 | 3/1977 | Cooper, Jr. . | |
| 4,066,370 | 1/1978 | Van Driesscle | 403/217 |
| 4,186,716 | 2/1980 | Baker et al. . | |
| 4,200,406 | 4/1980 | Fuss . | |
| 4,214,841 | 7/1980 | Hayashi . | |
| 4,267,682 | 5/1981 | Fowler et al. . | |
| 4,421,434 | 12/1983 | Magner . | |
| 4,712,942 | 12/1987 | Brown . | |

FOREIGN PATENT DOCUMENTS 78164 1/1955 Netherlands ......................... 248/165

Primary Examiner—Alvin C. Chin-Shue
Attorney, Agent, or Firm—Wall and Roehrig

[57] ABSTRACT

A collapsible workbench made up of three similar sections that are connected in assembly to form a three legged frame capable of supporting a flat panel or the like thereon.

12 Claims, 3 Drawing Sheets

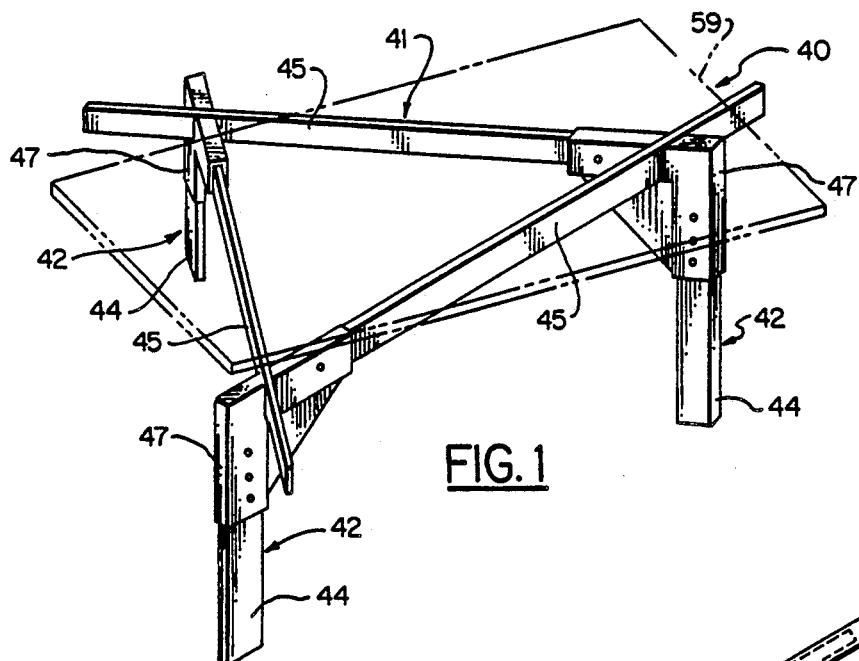
FIG. 1
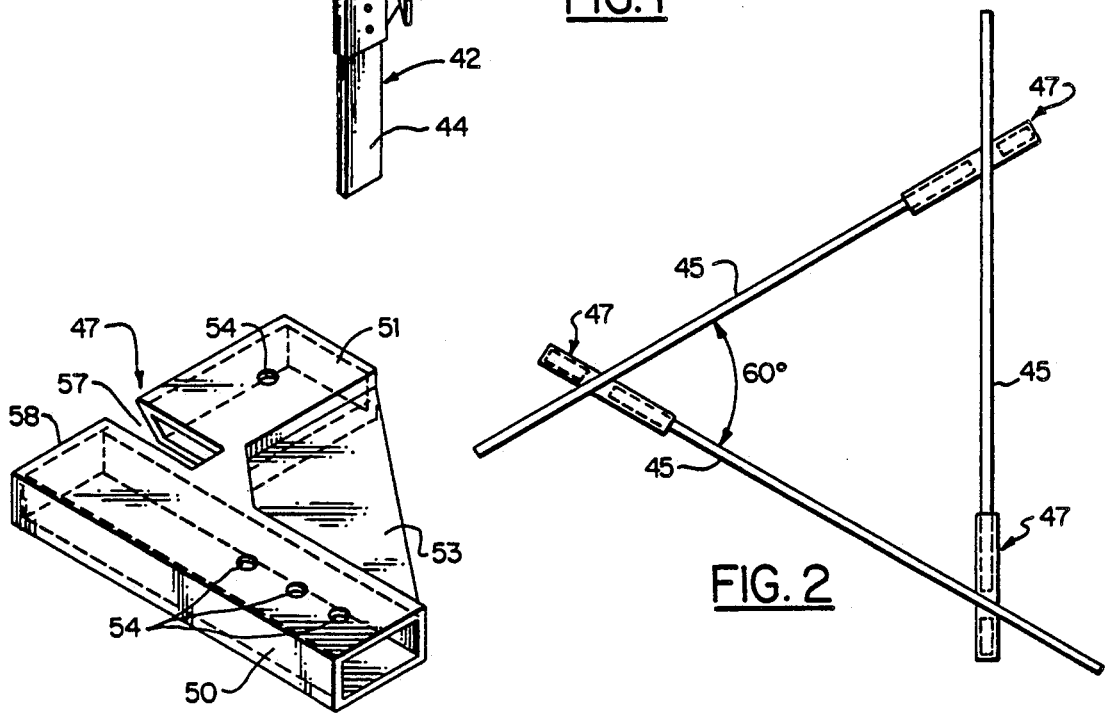
FIG. 3
FIG. 2
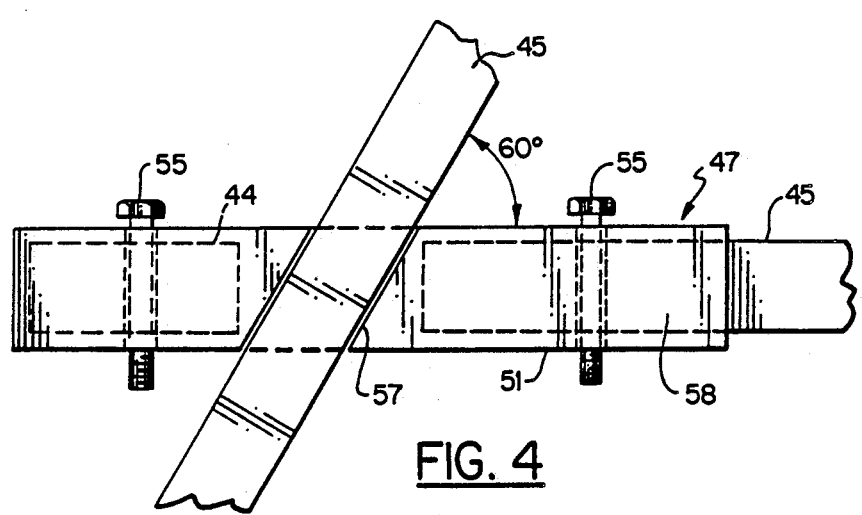
FIG. 4

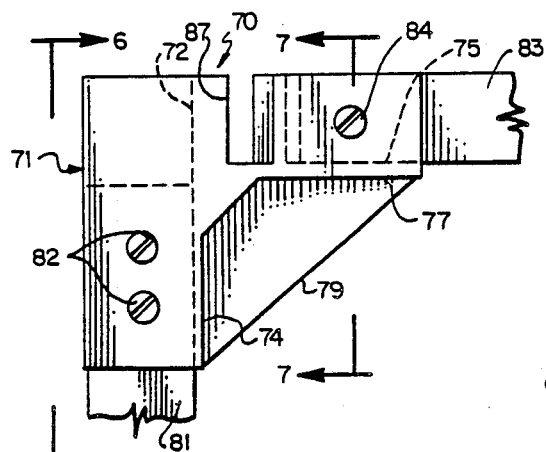
FIG. 5
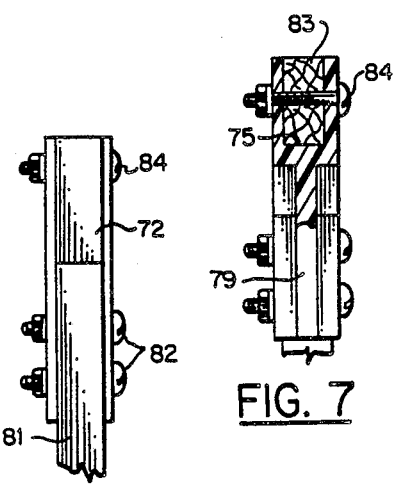
FIG. 7
FIG. 6
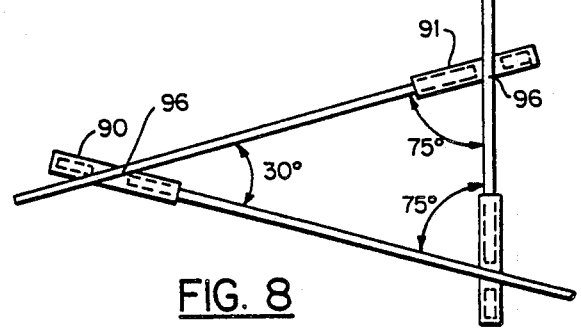
FIG. 8
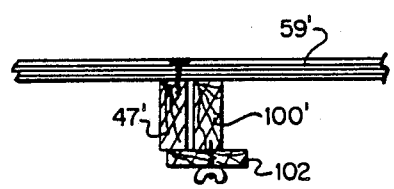
FIG. 11
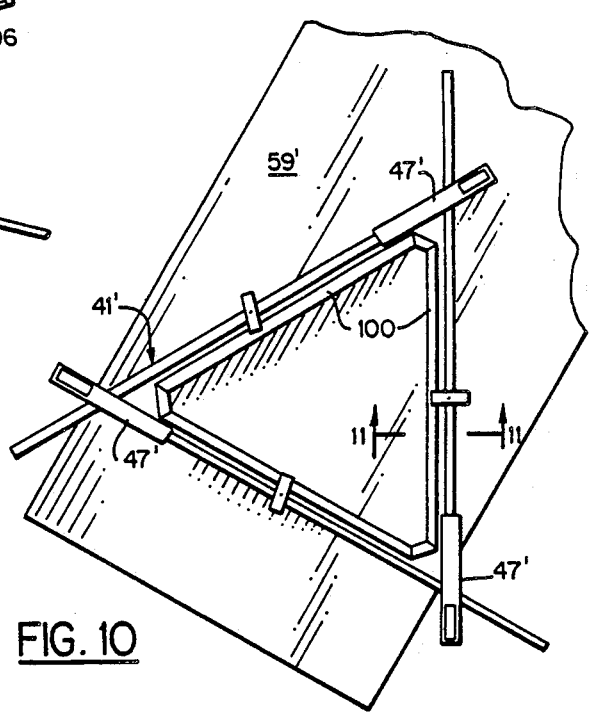
FIG. 10

THREE LEGGED WORKBENCH FRAME

This application is a continuation-in-part of my co-pending application Ser. No. 07/231,829 filed Aug. 12, 1988, U.S. Pat. No. 4,854,531, issued 8.8.89, which application is expressly incorporated herein by reference.

BACKGROUND OF THE INVENTION

This invention relates to a workbench and, in particular to a workbench having a three legged support frame that can be quickly and easily assembled and disassembled for ease of transportation and storage.

Most transportable work benches used by carpenters and other artisans whose work takes them to remote locations. generally consist of two four legged saw horses over which is placed a flat wooden panel which provides a working surface. Although, this type of bench can be easily erected and broken down at a work site, the assembled bench is generally unstable even when the saw horses are seated on a solid flat surface such as a concrete floor or the like. Each saw horse has four legs making a total of eight legs supporting the bench. If any of the eight legs is not securely resting on a support surface, the entire bench assembly will wobble when placed in use. Under certain loading conditions the bench may collapse and thus endanger the user, particularly where he or she is using a power tool. Although the bench can be broken down into three separate sections, each sawhorse is relatively bulky and therefore, difficult to store or load in the back of a truck.

Collins in U.S. Pat. No. 4,645,161 describes a collapsible four legged workbench that includes two spaced apart metal leg sections containing a pair of legs. The leg sections are attached to a central beam by a hinged bracket that enables each leg sections to be folded inwardly against the beam for ease of storage and/or transportation. Although the Collins work table represents an improvement over the conventional sawhorse assembly in that the number of support legs is reduced from eight to four, the four legged configuration still does not furnish the all around stability required by most skilled workmen. Again, the four legged bench like the eight legged counterpart can only be safely erected on a very flat and smooth support surface. Furthermore, the hinged bracket used by Collins becomes worn with time and use and thus can weaken to a point where the bracket fails. The bench typically collapses when it is being used and such failure can lead to injuries.

Arent, in U.S. Pat. No. 4,494,627 describes a three legged sawhorse. The sawhorse consists of a horizontal beam having two inclined legs attached to one end and a single leg attached to the other end. The sawhorse, however, cannot be broken down and the beam provides the user with only a limited amount of working area.

SUMMARY OF THE INVENTION

It is therefore an object of the present invention to improve work benches that are used by carpenters and the like.

It is a further object of the present invention to provide a frame for a portable work bench that will provide a stable support platform when seated upon rough or uneven terrain.

It is a still further object to provide a collapsible workbench that can be quickly erected to provide an extremely stable and strong platform upon which a craftsman can safely work.

Another object of the present invention is to provide a collapsible workbench that can be broken down into flat planar components for ease of storage and transportation.

It is another object of the present invention to provide a workbench that can be simply and easily adjusted in size to support a top panel with a wide variety of sizes and shapes.

It is a still further object of the present invention to provide a workbench frame that can be simply and easily interlocked with a top panel to form a stable and secure work surface.

These and other objects of the present invention are attained by means of a workbench that includes a frame having three interlocking sections. Each section contains a corner bracket for slidably receiving the adjacent ends of the vertical leg and the horizontal beam therein. The bracket also has a notch formed therein that has a width slightly greater than the width of the beam and a depth equal to the height of the beam. The notch forms an acute angle with one side wall of the bracket so that the distal end of a beam contained in one section can be slipped in a notch formed in another section to form a three legged support frame.

BRIEF DESCRIPTION OF THE DRAWING

For a better understanding of these and other objects of the present invention, reference is made to the following detailed description of the invention which is to be read in association with the accompanying drawings, wherein FIG. 1 is a perspective view showing an embodiment of the present invention wherein each section of the frame is equipped with a corner bracket for supporting a leg member and a beam member therein;

FIG. 2 is a top view of the bench shown in FIG. 1;

FIG. 3 is an enlarged perspective view of the corner bracket utilized in the bench illustrated in FIG. 1;

FIG. 4 is an enlarged top view of the bracket shown in FIG. 3 further showing a beam mounted therein;

FIG. 5 is a side elevation of a second bracket suitable for use in the frame shown in FIG. 1;

FIG. 6 is an end view taken along lines 6—6 in FIG. 5; and

FIG. 7 is a section taken along line 7—7 in FIG. 5;

FIG. 8 is a view similar to FIG. 2 showing another embodiment of the present invention;

FIG. 10 is a partial bottom view showing fastener buttons for interlocking the top to the frame;

FIG. 11 is a cross-sectional view along line 11—11 of FIG. 10; and

DESCRIPTION OF THE INVENTION

Figure 9:
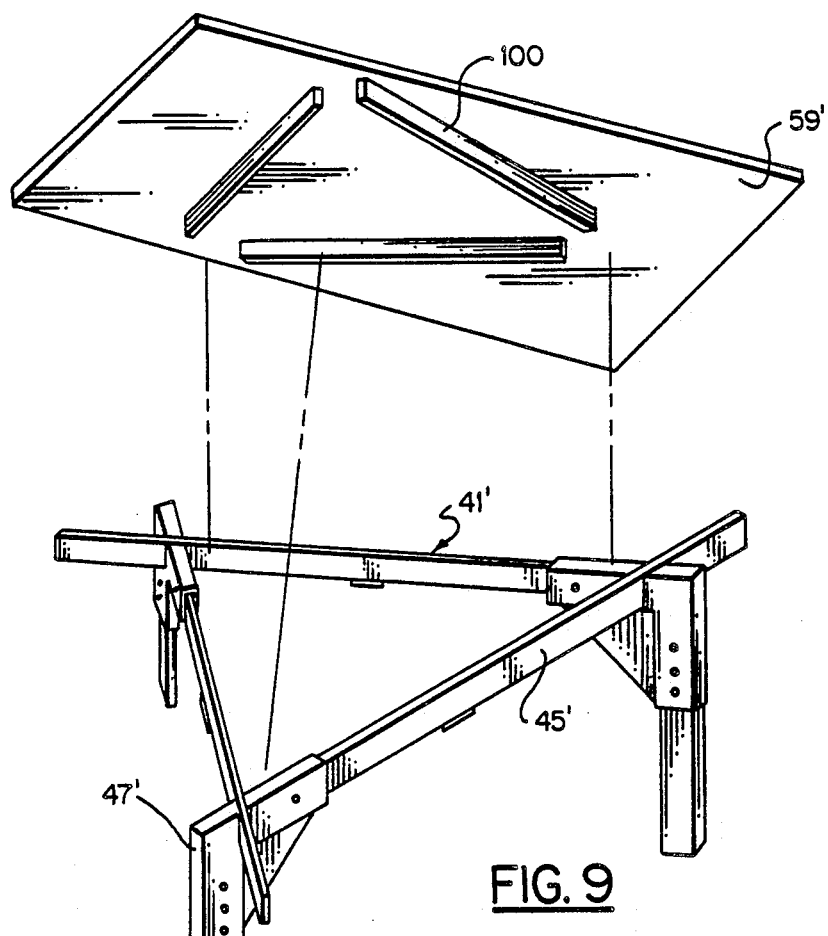
FIG. 9 is a view similar to FIG. 1 showing another embodiment having interlocking ribs mounted on the bottom side of the top panel member.

Turning now to FIGS. 1-4, there is shown an embodiment of the invention. The bench, generally referenced 40, contains a frame 41 that is formed by three interlocking sections 42. Each section further includes a vertically disposed leg 44 and a horizontally disposed beam 45 that are slidably contained within a corner bracket 47. The corner bracket is cast of metal or molded of plastic to the configuration shown in FIG. 3.

Each bracket includes a pair of perpendicularly aligned rectangular shaped hollow tubular members 50 and 51 that are aligned to form a right angle corner. A gusset 53 is located at the inside of the corner which connects the two members and provides additional strength to the bracket. The bottom end of vertical member 50 is open so that a leg 44 (FIG. 1) can be slidably received therein. Similarly, the outer end of the horizontal member 51 is also open so that a beam 45 can be inserted therein. Holes 54—54 pass through the sidewalls of the members. As seen in FIG. 4 locking pins 55—55 may be passed through the holes to hold the legs and the beams in assembly. A hole may be provided in each leg and beam to permit them to be aligned within the bracket. The vertical member contains a series of spaced pin receiving holes which enables the length of the leg to be adjusted in assembly so that the height of the frame can be set at a desired elevation.

An angularly disposed notch 57 is formed in each corner bracket for slidably receiving therein the distal end of a beam connected at its other end in a second bracket. The notch has a width slightly larger than the width of the beam and is passed downwardly through the top wall 58 of the bracket to a depth about equal to the depth of the beam. The notch is set at an angle of about 60 degrees (FIG. 1) with one of the side walls of the bracket, and is positioned at the back of the horizontal member adjacent to the vertical member.

As best seen in FIGS. 1 and 2, the three sections making up the frame are easily assembled by simply slipping the distal end of one beam into a notch provided in the bracket of a second section. When the frame is assembled, a flat panel 59 is laid over the beams and clamped in place to complete the bench assembly. The bench can be easily broken down and the sections easily stacked for storage or transporting. Removal of the legs and beams from the corner bracket will further reduce the amount of room required to store the component parts of the bench. It should be further noted that the size of the frame assembly can be adjusted by simply sliding the beams laterally in the bracket notches to selectively increase or decrease the size of the triangle formed by the three frame sections. The size of the frame can thus be adjusted to accommodate different size work elements such as doors, window frames, cabinets and the like.

Another type of corner bracket 70 suitable for use in the present invention is depicted in FIGS. 5–7. The bracket contains a right angle body 71 having an open sided vertical arm 74 and an open sided horizontal arm 77. The two arms are connected by a support gusset 79. A leg 81 is inserted into the vertical channel 72 formed in arm 74 and is held in place by suitable fasteners 82—82. A beam 83 is inserted into the vertical slot 75 of arm 77 and held in place by means of fastener 84. A rectangular notch 87 is formed in the top horizontal arm 77 behind the channel 75. The notch is formed at a 60 degree angle with one side wall of the bracket and dimensioned as described above to receive the distal end of a beam therein. The three sections making up the triangular frame are connected in assembly by simply sliding the beam of one section into the corner bracket of another section.

Referring now to FIG. 8 there is shown a still further embodiment of the present invention. In this embodiment the corner brackets 90 and 91 have at least two different angles for slots 96. One corner bracket has the slot 96 for receiving the distal end of the beam cut at an angle of approximately seventy-five degrees to one side wall of the bracket. A second bracket has the slot 96 formed at an angle of approximately thirty degrees to one side wall of the bracket. In this configuration, as shown in FIG. 8, two brackets of seventy-five degree slots and one bracket of a thirty degree slot are utilized to form a triangular support frame which takes on the form of an isosceles triangle rather than an equilateral triangle, as shown in the previous figures. This configuration is particularly useful where an elongated work surface is required for a job and permits the use of much longer panels by merely using longer beam members for the two longer sides of the triangle. It is thus possible to make a workbench of twelve or more feet in length with standard materials readily available on the job site.

Referring now to FIGS. 9 and 10, there is shown a still further embodiment of the present invention in which three corner brackets 47' are set up with beams and legs as in FIG. 1, and a top panel 59'. Panel 59' has mounted on the underside thereof three interlocking rib members 100 which are arranged in a triangular fashion to mate with the configuration of FIG. 9. These rib members 100 are secured to the underside of the top panel and have a depth approximately the same as the depth of the beam members 45' and are suspended in a vertical fashion from the underside of the top panel 59'. The frame member is then positioned so as to closely abut these interlocking rib members so as to hold them within the overall frame formed by the three horizontal beam members and the vertical leg members, such as shown in FIGS. 1, 9 and 10. The frame can be simply secured about these interlocking ribs so that the top cannot be readily tilted or removed from the frame 41'. This may be seen more clearly in FIG. 11 which shows a cross sectional view on line 11—11 of FIG. 10.

Figure 12:
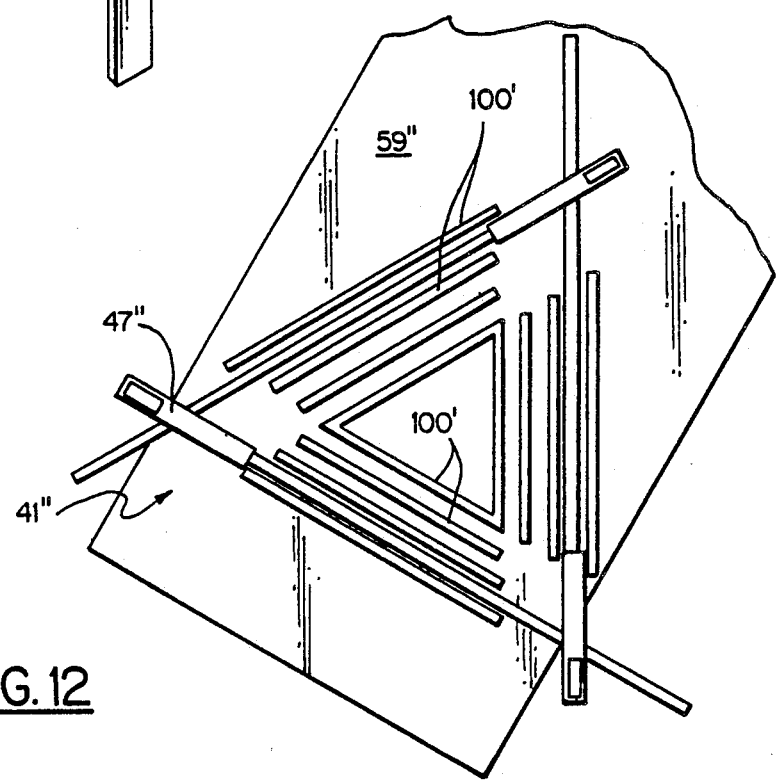
FIG. 12 is a view similar to FIG. 11 of a still further embodiment of the present invention showing a plurality of interlocking rib nests.

Alternatively, the interlocking ribs 100' (See FIG. 12) may be disposed in sets of different sizes on the underside of a top panel for cooperative interlocking with frame 41' adjusted to different sizes to permit the most advantageous work site setup in view of the uneven ground obstacles and so forth. This nesting arrangement of FIG. 12 also allows usage of different length beam members, depending on what is available at the job site. In some jobs, beam members no greater than seven or eight feet may be available, while on other job sites beam members of sixteen or eighteen feet in length may be available. This nesting arrangement therefore permits selection of the most suitable length of beam member for the desired use.

Interlocking members 100 and 100' maybe disposed at any relative angle to mate with the particular brackets available or required for the job.

As a further security measure to hold the top panel 59' in place on the frame 41', a rotatable winged, button-type fastener 102 can be simply and easily provided, such as shown in FIG. 11. This can be a simple wood cleat or a metal wing fastener, as is well-known in the art and can be simply and easily pivoted to engage the outer frame and prevent removal of the top panel therefrom. A series of these would be placed about the interlocking ribs at sufficient intervals to suitably secure the top panel member 59' to the frame 41'.

While this invention has been explained with reference to the structure disclosed herein, it is not confined to the details set forth and this application is intended to cover any modifications and changes as may come within the scope of the following claims.

What is claimed is:

1. A three legged workbench frame suitable for use on a rough, uneven support surface that includes a frame having three interlocking sections, each section further including a vertically disposed leg for supporting the frame on a support surface, a horizontally disposed beam, and a corner bracket for joining one end of the beam to the top of said leg, each corner bracket having a slot passing downwardly through the top surface thereof behind said one end of the beam, said slot being disposed at an acute angle with reference to said beam and extending downwardly to a depth equal to the height of said beam for slidably receiving a second beam contained in another section therein so that three sections form an adjustable triangular shaped frame.

2. The frame of claim 1 wherein the slot formed in two of the corner brackets is disposed at the same angle with respect to the beam and in a third corner bracket the slot is disposed at a different angle with respect to the beam.

3. The frame of claim 1 wherein the leg and the beam associated with each corner bracket are slidably received in complementary housings formed in the bracket.

4. The frame of claim 3 that further includes locking means for securing the leg and the beam within said housings.

5. The frame of claim 3 wherein said openings are disposed in perpendicular alignment within the bracket and said gusset means is connected to each housing.

6. The frame of claim 1 that further includes a top panel mounted upon the beams.

7. A workbench as defined in claim 6 including interlocking means secured to the underside of said top panel, said interlocking means comprising three rib members mounted on the underside of said panel in complementary triangular shape to said triangular shaped fame in the triangular interior shape formed by said three interlocking sections of said three legged workbench frame.

8. A workbench frame as described in claim 1 wherein two corner brackets have slots disposed at 75° angles and one bracket has a slot disposed at a 30° angle with respect to said beams.

9. A three legged workbench frame suitable for use on a rough, uneven support surface that includes a frame having three interlocking sections, each section further including a vertically disposed leg for supporting the frame on a support surface, a horizontally disposed beam, and a corner bracket for joining one end of the beam to the top of said leg, each corner bracket having a slot passing downwardly through the top surface thereof behind said one end of the beam, said slot being disposed at an acute angle with reference to said beam and extending downwardly to a depth equal to the height of said beam for slidably receiving a second beam contained in another section therein so that three sections form an adjustable triangular shaped frame which further includes a top panel mounted upon the beams, the top panel having a set of interlocking ribs mounted on one side of said top panel, said ribs being positioned to abut the inside vertical surface of said horizontally disposed beams to interlock the top panel within said workbench frame.

10. The workbench of claim 9 that further includes a plurality of sets of rib members mounted in spaced triangular alignment on the underside of said top panel so that different size three legged workbench frames may be engaged about said interlocking ribs to secure said top panel to the workbench frame.

11. The workbench of claim 10 further including a plurality of rotatable wing buttons mounted on the underside of said ribs and adapted to engage the underside of said horizontal beam members when positioned within a three legged workbench frame when rotated to an angle of ninety degrees from the rib member on which it is mounted.

12. A three legged workbench frame suitable for use on a rough, uneven support surface that includes a frame having three interlocking sections, each section further including a vertically disposed leg for supporting the frame on a support surface, a horizontally disposed beam, and a corner bracket for joining one end of the beam to the top of said leg, each corner bracket having a slot passing downwardly through the top surface thereof behind said one end of the beam, said slot being disposed at an acute angle with reference to said beam and extending downwardly to a depth equal to the height of said beam for slidably receiving a second beam contained in another section therein so that three sections form an adjustable triangular shaped frame, each bracket further including a gusset means positioned beneath said slot for bearing loads placed upon said frame.

* * * * *